US008887161B2

(12) United States Patent
Yuyitung et al.

(10) Patent No.: US 8,887,161 B2
(45) Date of Patent: Nov. 11, 2014

(54) SYSTEM AND METHOD FOR ESTIMATING COMBINED WORKLOADS OF SYSTEMS WITH UNCORRELATED AND NON-DETERMINISTIC WORKLOAD PATTERNS

(75) Inventors: Tom Silangan Yuyitung, Toronto (CA); Andrew Derek Hillier, Toronto (CA)

(73) Assignee: CiRBA Inc., Richmond Hill (CA)

( * ) Notice: Subject to any disclaimer, the term of this patent is extended or adjusted under 35 U.S.C. 154(b) by 61 days.

(21) Appl. No.: 12/847,204

(22) Filed: Jul. 30, 2010

(65) Prior Publication Data

US 2010/0299675 A1 Nov. 25, 2010

Related U.S. Application Data

(63) Continuation of application No. PCT/CA2009/000164, filed on Feb. 12, 2009.

(60) Provisional application No. 61/028,323, filed on Feb. 13, 2008.

(51) Int. Cl.
*G06F 9/46* (2006.01)
*G06F 11/34* (2006.01)

(52) U.S. Cl.
CPC ........ *G06F 11/3495* (2013.01); *G06F 11/3447* (2013.01)
USPC ......................................... 718/101; 718/102

(58) Field of Classification Search
USPC ......................................................... 702/181
See application file for complete search history.

(56) References Cited

U.S. PATENT DOCUMENTS

| 4,023,024 | A  | * | 5/1977 | Bishop ............................. 377/37 |
| 7,930,573 | B2 | * | 4/2011 | Bland et al. .................... 713/320 |
| 2005/0209833 | A1 |   | 9/2005 | Bishop et al. |
| 2006/0036405 | A1 | * | 2/2006 | Byrd et al. .................... 702/186 |

FOREIGN PATENT DOCUMENTS

WO WO 2007/121571 A1 4/2007

OTHER PUBLICATIONS

Hillier, Andrew; "A Quantitative and Analytical Approach to Server Consolidation" dated Jan. 2006,published at least as early as Feb. 3, 2006; CiRBA Inc.; Technical Whitepaper.*
Hilllier, Andrew; "Advanced Workload Analysis Techniques"; Cirba Technical Whitepaper; Apr. 2008.
Hilllier, Andrew; "Dynamic Capacity Management in Virtual Environments"; Cirba Technical Whitepaper; Augustl 2008.
Tsagaris, Nicholas; Search Report from corresponding PCT Application No. PCT/CA2009/000164; search completed Apr. 20, 2009.

* cited by examiner

*Primary Examiner* — Meng An
*Assistant Examiner* — Wissam Rashid
(74) *Attorney, Agent, or Firm* — Brett J. Slaney; Blake, Cassels & Graydon LLP

(57) ABSTRACT

It has been found that a more reasonable estimation of combined workloads can be achieved by enabling the ability to specify the confidence level in which to estimate the workload values. A method, computer readable medium and system are provided for estimating combined system workloads. The method comprises obtaining a set of quantile-based workload data pertaining to a plurality of systems and normalizing the quantile-based workload data to compensate for relative measures between data pertaining to different ones of the plurality of systems. A confidence interval may then be determined and the confidence interval used to determine a contention probability specifying a degree of predicted workload contention between the plurality of systems according to at least one probabilistic model. The contention probability may then be used to combine workloads for the plurality of systems and a result indicative of one or more combined workloads then provided.

27 Claims, 4 Drawing Sheets

SYSTEM AND METHOD FOR ESTIMATING COMBINED WORKLOADS OF SYSTEMS WITH UNCORRELATED AND NON-DETERMINISTIC WORKLOAD PATTERNS

CROSS-REFERENCE TO RELATED APPLICATIONS

The present application is a continuation of International PCT Application No. PCT/CA2009/000164 filed Feb. 12, 2009 which claims priority from U.S. Provisional Application No. 61/028,323 filed on Feb. 13, 2008 both incorporated herein by reference.

TECHNICAL FIELD

The following relates to systems and methods for estimating the combined workloads for a set of systems with uncorrelated and non-deterministic workload patterns.

BACKGROUND

As organizations have become more reliant on computers for performing day to day activities, so too has the reliance on networks and information technology (IT) infrastructures increased. It is well known that large organizations having facilities in different geographical locations utilize distributed computing systems connected locally over local area networks (LAN) and across the geographical areas through wide-area networks (WAN).

While the benefits of a distributed approach are numerous and well understood, there has arisen significant practical challenges in managing such systems for optimizing efficiency and to avoid redundancies and/or under-utilized hardware. Decentralized control and decision making around capacity, the provisioning of new applications and hardware, and the perception that the cost of adding server hardware is generally inexpensive, have created environments with far more processing capacity than is required by the organization.

When cost is considered on a server-by-server basis, the additional cost of having underutilized servers is often not deemed to be troubling. However, when multiple servers in a large computing environment are underutilized, having too many servers can become a burden. Too many servers result in extra costs, mostly through additional capital, maintenance and upgrade expenses; redundant software licenses; and excess heat production and power consumption. As such, removing even a modest number of servers from a large computing environment can save a significant amount of cost on a yearly basis.

As a result, organizations have become increasingly concerned with such redundancies and how they can best achieve consolidation of capacity to reduce operating costs. The cost-savings objective can be realized through consolidation strategies such as, but not limited to: virtualization, operating system (OS) level stacking, database consolidation, application stacking, physical consolidation, and storage consolidation.

In general, all consolidation strategies listed above involve combining one or more source systems onto one or more target systems. Unfortunately, choosing the most appropriate sources and targets to consolidate is a daunting task. There typically is a large number of possible consolidation combinations to consider for a given set of consolidation candidates.

To determine the most suitable consolidation solution, one must, at a minimum, consider the potential constraints imposed by key system resources such as, but not limited to, CPU utilization, disk I/O activity, network I/O activity, memory utilization, etc. To evaluate the resource constraints for a set of systems to be consolidated, one must model the projected resource utilization levels of the combined systems and compare the projected values against the respective capacities of the target systems.

System workload data is normally collected as time series data (e.g. 5 minute samples). If the workload patterns of the systems are highly deterministic, an effective method for modeling the combined workload is to sum the historical time series data of the systems at like times. However, if the utilization patterns are stochastic, simply adding time series workload data of multiple systems may not be representative of the combined utilization patterns due to the unpredictable levels of workload contention between the systems.

Instead, a more sophisticated method for modeling the combined workloads of systems with stochastic data should be employed.

SUMMARY

A method is provided that comprises the ability to specify the degree of conservatism in the estimate through a confidence level. There is provided a mechanism to specify the degree of predicted workload contention between systems through confidence levels based on probabilistic models, which is also efficient when computing the estimated workloads to support rapid evaluation of a large number of possible consolidation scenarios.

In one aspect, there is provided a method for estimating combined system workloads, the method comprising: obtaining a set of quantile-based workload data pertaining to a plurality of systems; normalizing the quantile-based workload data to compensate for relative measures between data pertaining to different ones of the plurality of systems; determining a confidence interval; using the confidence interval to determine a contention probability specifying a degree of predicted workload contention between the plurality of systems according to at least one probabilistic model; using the contention probability to combine workloads for the plurality of systems; and providing a result indicative of one or more combined workloads.

In another aspect, a computer readable medium is provided comprising computer executable instructions for performing the method.

In yet another aspect, a system is provided which comprises a database, a processor, and the computer readable medium.

BRIEF DESCRIPTION OF THE DRAWINGS

An embodiment of the invention will now be described by way of example only with reference to the appended drawings wherein.

DETAILED DESCRIPTION OF THE DRAWINGS

It has been found that an effective method for characterizing stochastic data is through quantiles for a fixed time period (e.g. hourly minimum, $1^{st}$ quartile, median, $3^{rd}$ quartile, and maximum). However, estimating the combined workload for multiple systems based on the quantile data is typically not so simple. For example, to estimate the maximum of the combined workload for multiple systems, one could simply add all the maximum values together. Similar calculations can be performed for other quantiles. Unfortunately, the sum of the maximum values represents the extreme maximum value since it assumes that the maximums for all systems occur at the same time. For cases with many systems being combined, the likelihood of all systems being at their peak value at the same time is highly unlikely. As such, adding like statistics (e.g. minimums, maximums, etc.) can generate results that do not reflect real world scenarios.

It has been recognized that a more reasonable estimation of combined workloads can be achieved by enabling the ability to specify the confidence level in which to estimate the workload values. The confidence level can range from 0 to 100% and controls the degree of conservatism in estimating the combined workloads.

At a level of 100%, the calculations of combined workloads considers all possible combinations, reflecting the most extreme cases by simply adding like statistics. The predicted maximum and minimum values would then be the sum of the maximums and minimums respectively.

At a level of 0%, the calculations of combined workloads consider the most limited of combinations, making the results approach the sum of the average values.

At levels between 0 and 100%, the calculations of combined workloads consider combinations that are between the average and the extreme scenarios.

Workload Analyses—Overview

Figure 1:
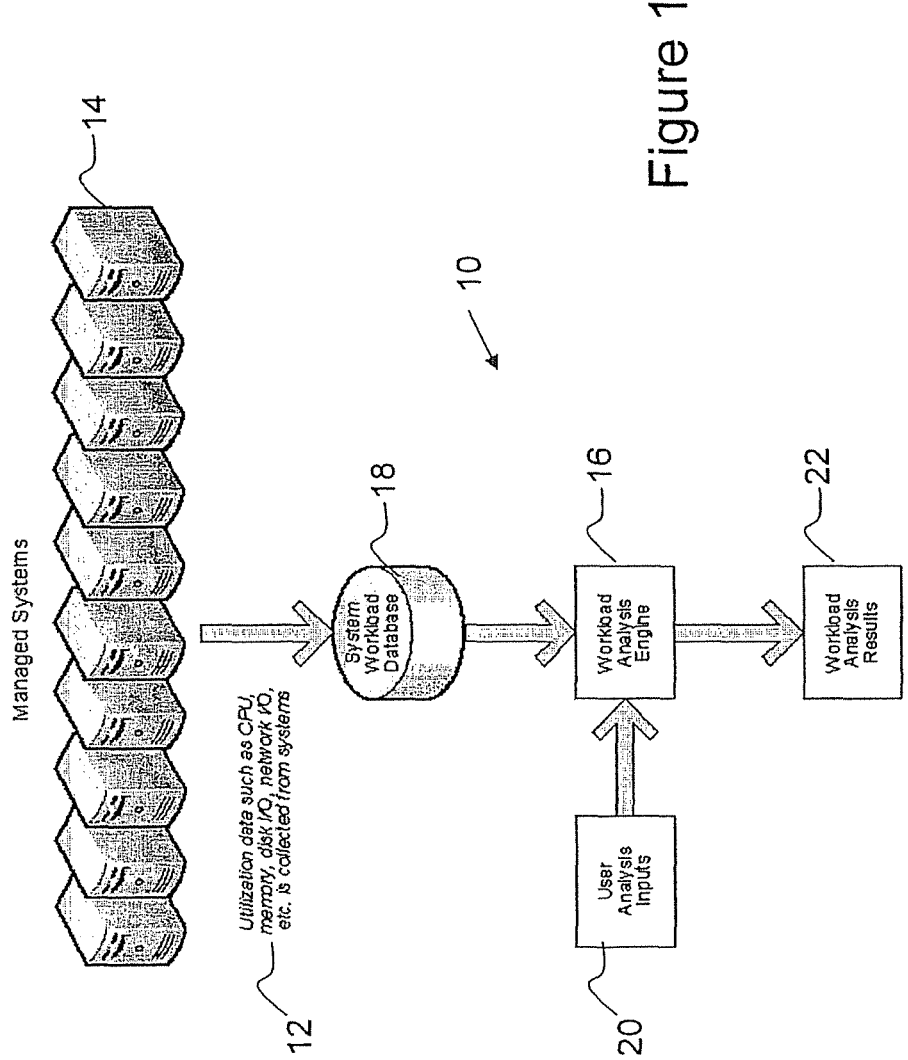
FIG. 1 is a block diagram illustrating a workload analysis system.

Turning now to FIG. 1, a workload analysis system for analyzing workload data 12 obtained from one or more managed systems 14 is generally denoted by numeral 10. It will be appreciated that a "system" or "computer system" hereinafter referred, can encompass any entity which is capable of being analysed based on any type of utilization data and should not be considered limited to existing or hypothetical physical or virtual systems etc.

The workload analysis system 10 comprises a workload analysis engine 16, which comprises software, hardware or a combination thereof and is capable of obtaining data 12 stored in a system workload database 18, process such data 12 while taking into account user analysis inputs 20 to generate workload analysis results 22. It can be appreciated that the workload analysis system 10 can be implemented as a remote service, locally running application, or in any other suitable configuration capable of applying the principles discussed herein.

Figure 2:
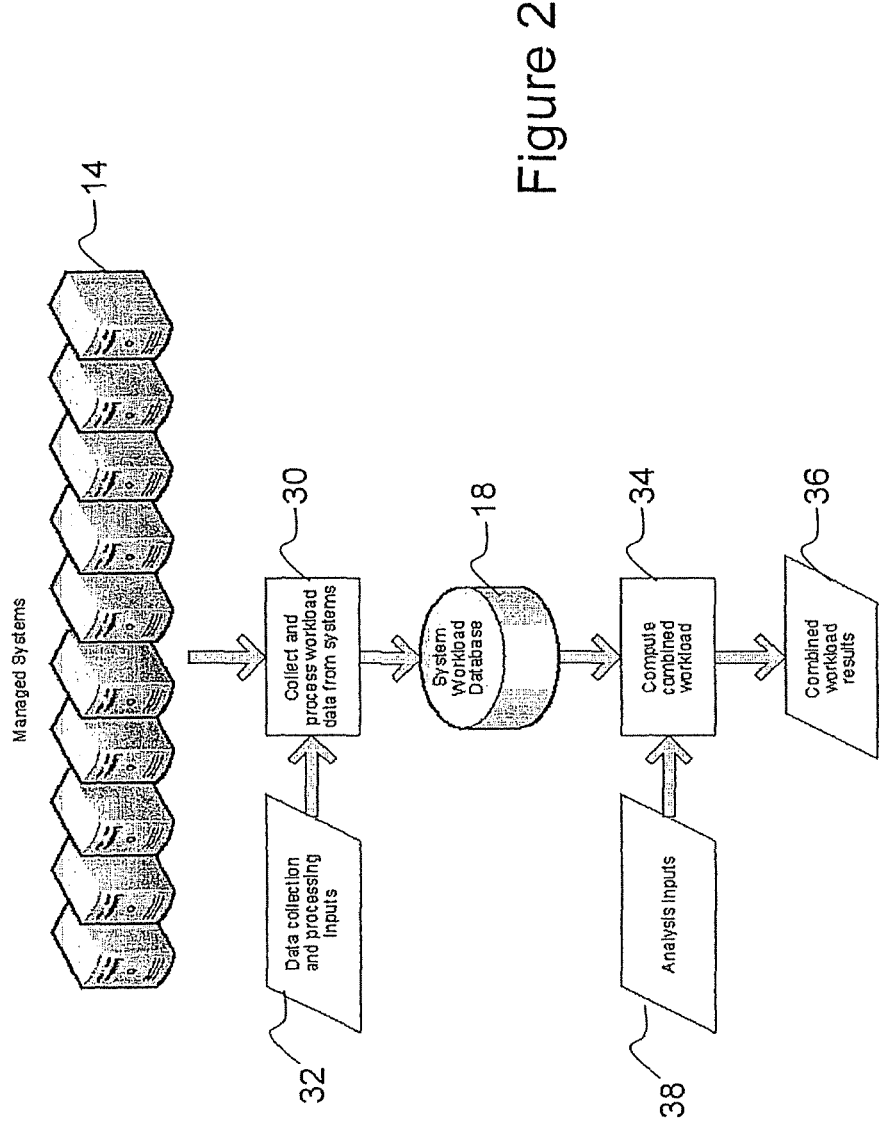
FIG. 2 is a flow diagram illustrating an exemplary procedure for performing a combined workload analysis using the system of FIG. 1.

A high level data flow for the workload system 10 is shown in FIG. 2. At 30, the workload data 12 is collected from the systems 14 and processed before being stored in the system workload database 18. The workload data 12 may have been obtained in advance or may be acquired in real time during the analysis. Data collection and processing inputs 32 are used in this example in order to facilitate the collection and processing of workload data 12 at 30. At 34, combined workloads are computed in order to generate combined workload results 36. A set of analysis inputs 38 are used in this example in order to facilitate the computation of the combined workloads at 34.

Figure 3:
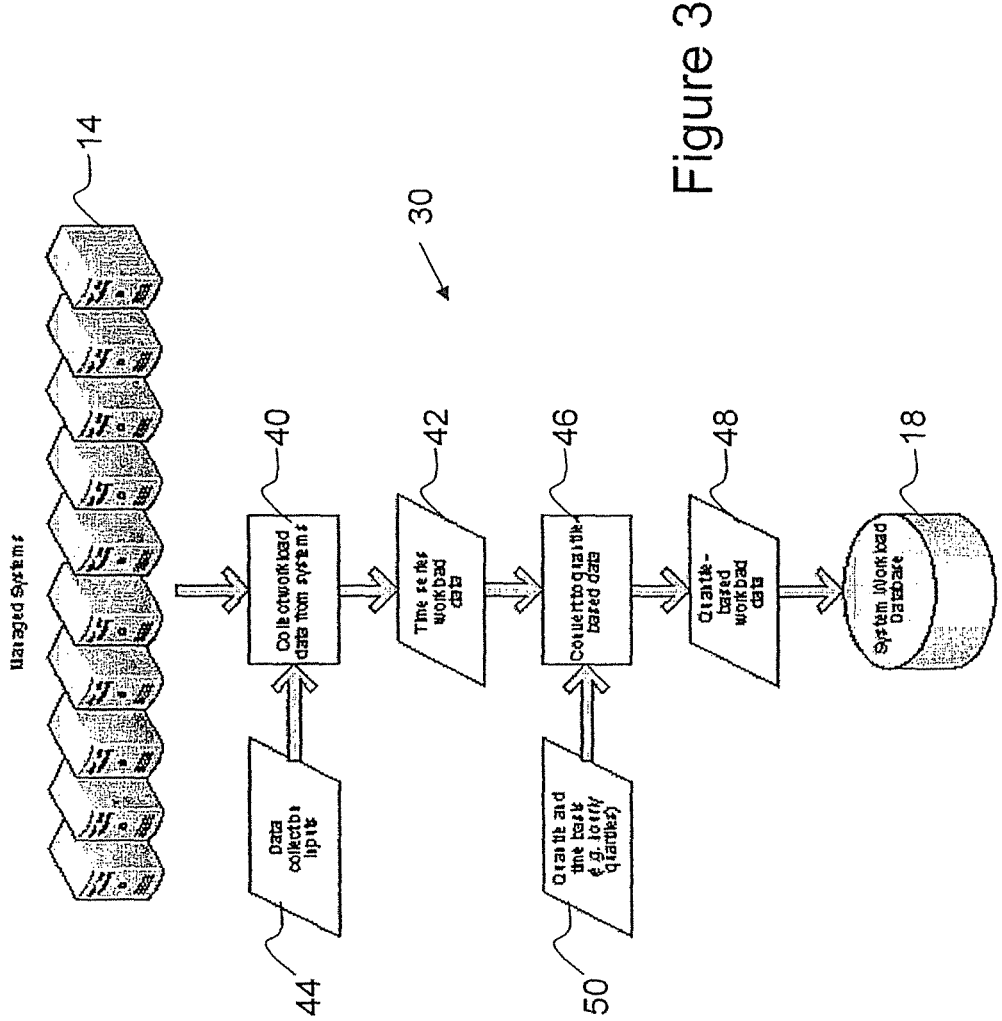
FIG. 3 is a flow diagram illustrating further detail concerning the collection and processing of workload data step shown in FIG. 2.

FIG. 3 provides further detail of an embodiment for collecting and processing workload data at step 30 shown in FIG. 2. At 40, the workload data is collected from the systems 14 using data collection inputs 44, and time series workload data 42 may then be generated. The time series workload data 42 is then converted at 46 to quantile based data 48 using quantile and time basis inputs 50 (e.g. hourly quartiles). The quantile and time basis inputs 50 are typically dependent on the nature of the time series workload data 42, e.g. frequency of time series, etc. The quantile based workload data 48 is then stored in the system workload database 18 for subsequent processing, details of which are exemplified in FIG. 4.

Figure 4:
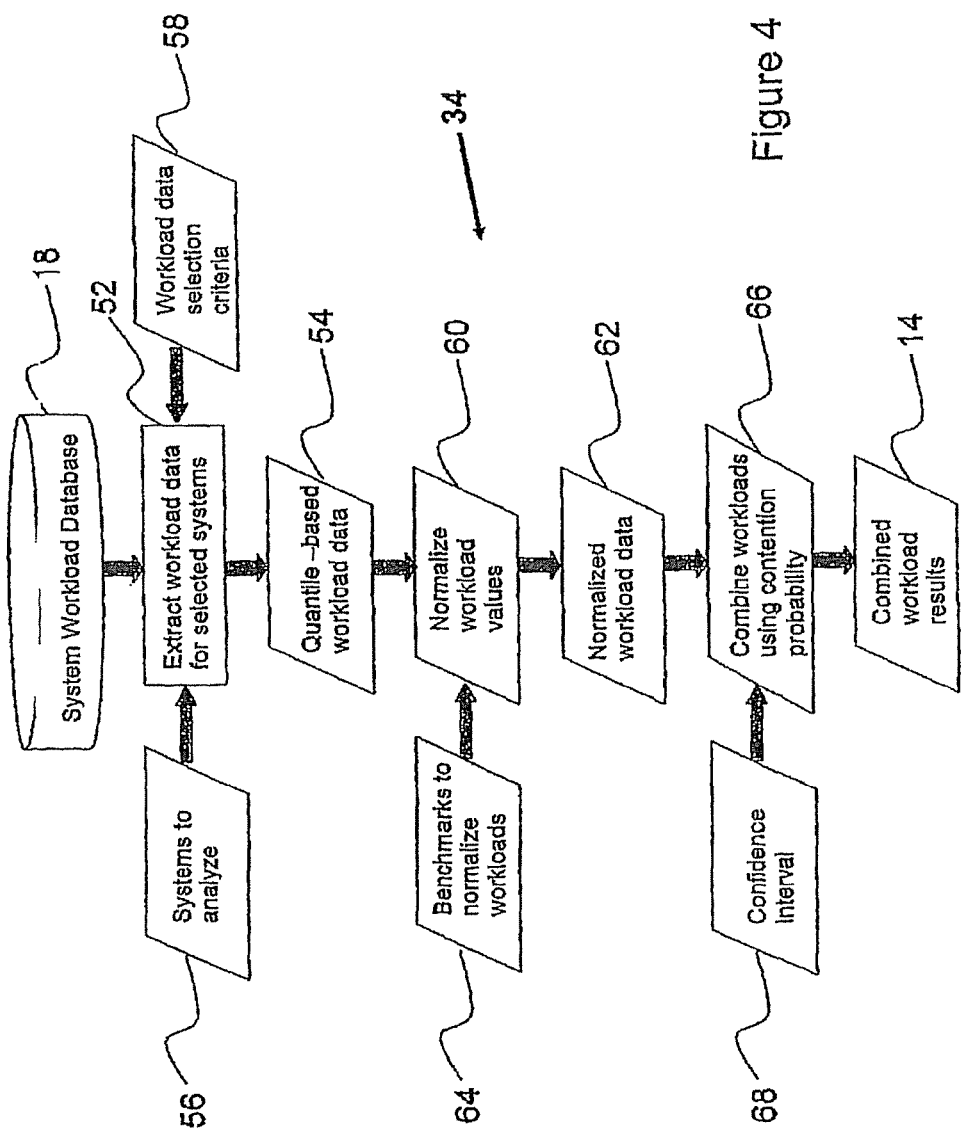
FIG. 4 is a flow diagram illustrating further detail concerning the combined workload computation shown in FIG. 2.

Turning to FIG. 4, upon initiating a new analysis for a selected set of one or more systems, the workload data for the selected systems is extracted from the system workload database 18 at 52, based on input 56 regarding the systems to analyze and workload data selection criteria 58. The workload data selection criteria define how to choose the actual data to be used in the assessment for each system. The criteria include the specific workload metrics to be analyzed (e.g. CPU utilization, disk I/O activity, network I/O activity, etc.), a date range specifying the time period from which to select historical data, and additional specification for choosing what comprises the representative data (e.g. busiest, least busy, typical, average, etc.).

Upon extracting the workload data at 52, a set of quantile-based workload data 54 is obtained, which may then be normalized 60, using workload normalization benchmarks 64. Data normalization is required for workload metrics such as % CPU utilization which represent relative measures of CPU usage levels of the respective systems. Such relative values from different systems cannot simply be added together to estimate their combined workload level. Prior to combining such metrics, they should be normalized on an absolute measure using CPU benchmarks such as SPEC CINT Rate 2006. A set of normalized workload data 62 is thus produced and, by selecting a confidence interval 68, the workloads for the selected systems 14 can be combined at 66 using contention probability. The combined workload results 36 are then generated and can be used in subsequent analyses.

As will be explained in greater detail below, better combined system workload estimates can be obtained by specifying and utilizing a confidence interval in estimating the combination of workloads using quantile-based values.

Estimating Combined System Workloads with Variable Contention

As discussed above, accurately predicting the combined workloads of multiple systems based on historical data can be difficult due to the randomness and variability of system workloads (such as CPU utilization, disk I/O rates, network I/O rates) over time. This following methodology describes an embodiment for estimating the addition/combination of uncorrelated system workloads using statistical models that consider the probability of workload contention based on a specified confidence level. It may be noted that applications for accurate predictions of system workloads include server consolidation and virtualization analysis, pro-active capacity management, and capacity planning.

The methodology herein described utilizes the following concepts: historical workload data is represented using quantiles over time-based windows; and within a representative time window, the combined system workloads are estimated using probabilistic models that predict the degree of workload contention between the systems.

As shown in FIG. 3, historical workload data is commonly represented as time series data 42. For example, the % CPU utilization of a system 14 for an hour may be presented as time series data at 5 minute intervals as shown below in Table 1.

TABLE 1

Sample Time Series Data

| Timestamp | % CPU |
|---|---|
| 00:00 | 10 |
| 00:05 | 10 |
| 00:10 | 20 |
| 00:15 | 30 |
| 00:20 | 50 |
| 00:25 | 20 |
| 00:30 | 80 |
| 00:35 | 100 |
| 00:40 | 80 |
| 00:45 | 80 |
| 00:50 | 30 |
| 00:55 | 20 |

Historical data can also be represented using the mean, minimum, maximum and quantiles over time-based windows, i.e. quantile-based data 48. Quantiles are points taken at regular intervals which divide a sorted data set into equal parts. Some quantiles have special names such as percentiles (100-quantiles), deciles (10-quantiles) and quartiles (4-quantiles). The mean, minimum, maximum and quantile values for the time window can be derived from the time series data 42 and provide a more compact data representation. The mean % CPU value for the hour of data shown in Table 1 above, is 44.2. The minimum, maximum and quartiles are listed below in Table 2:

TABLE 2

Sample Quartiles

| Quantile | Value |
|---|---|
| Minimum | 10 |
| $1^{st}$ Quartile | 20 |
| $2^{nd}$ Quartile | 30 |
| $3^{rd}$ Quartile | 80 |
| Maximum | 100 |

It may be noted that when using quartiles, the $1^{st}$ quartile here represents the value from Table 1 at which 25% of the values are at or below that value, the $2^{nd}$ quartile represents the value at which 50% of the values are at or below that value, and the $3^{rd}$ quartile represents the value at which 75% of the values are at or below that value.

To minimize information loss due to the quantization of the data, the granularity of the quantiles (e.g. quartiles vs. deciles) and time window size (e.g. 1 hour vs. 1 day) should be chosen according to the stochastic nature of the time-series data 42 and sampling rates. This can be done by adjusting the quantile and time basis inputs 50.

For a chosen time window, the combined workloads of multiple systems 14 can be estimated using various techniques.

One approach for combining the system workloads is to sum like values. For example, the total minimum value is the sum of the minimum values of the systems being combined. The total mean, maximum value and quartiles can be computed in a similar manner, as exemplified below.

$Min_{total} = Min_{system1} + Min_{system2} + Min_{system3} + \ldots$ $Q1_{total} = Q1_{system1} + Q1_{system2} + Q1_{system3} + \ldots$ $Q2_{total} = Q2_{system1} + Q2_{system2} + Q2_{system3} + \ldots$ $Q3_{total} = Q3_{system1} + Q3_{system2} + Q3_{system3} + \ldots$ $Max_{total} = Max_{system1} + Max_{system2} + Max_{system3} + \ldots$ $Mean_{total} = Mean_{system1} + Mean_{system2} + Mean_{system3} + \ldots$ It can be appreciated that the sum of the means is an accurate measure of the combined workload means. However, it has been realized that the sum of the minimums, maximums and quartiles may not be as representative of the combined workloads.

The sum of the minimums and maximums represent the outer envelope of these extreme values. For instance, the sum of the maximums reflects the theoretical maximum (or worst case scenario) since all the maximum values for each system 14 are assumed to occur at the same time within the time window. As more system workloads are combined, the likelihood of all extreme values occurring at the same time decreases. Thus, the above estimate becomes less likely as the number of systems 14 combined increase.

To a lesser degree, this effect applies to the estimate for the quartile totals as well.

It has therefore been found that to better estimate combined system workloads, workload contention probability should be considered. Assuming that the variability of system workloads are not correlated, the likelihood of specific quantile values (e.g. maximums) of multiple systems coinciding within the common time window can be predicted using the cumulative binomial distribution function:

$$F(m; n, p) = \sum_{k=0}^{m} \binom{n}{k} p^k (1-p)^{n-k}$$

Where:

F is the contention probability that at least m systems are simultaneously at the common quantile value type (e.g. maximum).

m is the number of systems simultaneously at the common quantile value.

n is the total number of systems being combined.

p is the probability of the quantile value occurring for each system within the time window.

The probability, p for a specific quantile (or minimum/maximum) value occurring within the time window depends on the quantile size. In general, it can be observed that each inner quantile value has twice the likelihood as the outer minimum and maximum values. Thus, in the case of quartiles, the probabilities would be as follows shown in Table 3 below:

TABLE 3

Quartile Probabilities

| Quartile | Probability |
|---|---|
| Minimum | 12.5% |
| $1^{st}$ Quartile | 25% |
| $2^{nd}$ Quartile | 25% |
| $3^{rd}$ Quartile | 25% |
| Maximum | 12.5% |

For example, for 10 systems (n=10) and assuming 12.5% probability of a specific quantile occurring for each system (p=0.125), contention probabilities F can be computed as a function of the number of systems (m) in contention at the quantile value as shown below in Table 4.

TABLE 4

Cumulative Contention Probability Example

| m (systems in contention) | F (contention probability) |
|---|---|
| 0 | 0.263 |
| 1 or less | 0.639 |
| 2 or less | 0.880 |
| 3 or less | 0.973 |
| 4 or less | 0.996 |
| 5 or less | 0.9995 |
| 6 or less | 0.99996 |
| 7 or less | 0.999998 |
| 8 or less | 0.99999993 |
| 9 or less | 0.9999999991 |
| 10 or less | 1 |

The contention probability F is the likelihood that m or less systems are concurrently at the quantile value. It may be noted that these contention probabilities differ when the total number of systems (n) varies.

For example, given a confidence level of 99%, it can be assumed that 3 or less systems will be at their respective maximum values at the same time (i.e. in contention). Similarly, given a confidence level of 90%, it can be assumed that 2 or less systems will be in contention.

The combined maximum workload value can be estimated for a specified confidence level by blending 3 components: the 'worst' case value of the maximum values, the average of the other maximum values, and the average of the remaining values (excluding the worst case and a portion of the remaining values). These 3 components are blended according to a ratio derived from the predicted contention level. The likely number of system workloads to be in contention at their respective maximum value is determined from the confidence level and the contention probability.

Accordingly, the combined maximum can be estimated as follows:

$$Max_{total} = Max_{max} + (m-1)*Max_{avg} + (n-m)*(Overall_{avg} - (m-1)*Max_{avg}/(n-1))$$

Where:

$Max_{max}$ is largest of the maximum values $Max_{avg}$ is the average of the maximum values of the other systems (i.e. excluding system with the $Max_{max}$)

$Overall_{avg}$ is the overall average of the other systems excluding the values associated with the system with the $Max_{max}$.

n is the total number of systems being combined.

m is the likely number of systems in contention at the maximum value.

At the 100% confidence level, m=n, and the combined maximum is equal to the sum of the maximums. At confidence levels less than 100%, the combined maximum tends towards the overall average value. At a confidence level of 0%, m=1, and the combined maximum is a blend of the largest maximum and the overall average—resulting in the actual overall average.

In addition, the combined maximum should always be greater than or equal to the overall average. If the computed maximum value is less than the overall average, it should then be set to the average value.

Similarly, the combined minimum can be estimated as follows:

$$Min_{total} = Min_{max} + (m-1)*Min_{avg} + (n-m)*(Overall_{avg} - (m-1)*Min_{avg}/(n-1))$$

Where:

$Min_{max}$ is the largest of the minimum values.

$Min_{avg}$ is the average of the minimum values of the other systems (i.e. excluding the system with the $Min_{max}$).

$Overall_{avg}$ is the overall average of the other systems excluding the values associated with the system with the $Min_{max}$.

n is the total number of system being combined.

m is the likely number of systems in contention at the minimum value.

In addition, the combined minimum should always be less than or equal to the overall average. If the computed minimum value is less than the overall average, it should then be set to the average value.

At the 100% confidence level, m=n, and the combined minimum is equal to the sum of the minimums. At confidence levels less than 100%, the combined minimum tends towards the overall average value. At a confidence level of 0%, m=1, and the combined minimum is a blend of the largest minimum and the overall average—resulting in the actual overall average.

In addition, the combined minimum should always be less than or equal to the overall average. If the computed value is greater than the overall average, it should then be set to the average value.

Once the combined minimum and maximum values have been established, the combined values for the inner quantiles can be estimated by interpolating between the estimated combined minimum and maximum values using their relative ratios from the 100% confidence case.

$$Q_{total} = (Q_{total@100} - Min_{total@100}) * (Max_{total} - Min_{total}) / (Max_{total@100} - Min_{total@100}) + Min_{total}$$

Where:

$Q_{total}$ is the combined inner quantile value at the desired confidence level $Q_{total@100}$ is the combined inner quantile value at the 100% confidence level $Min_{total}$ is the combined quartile value at the desired confidence level $Min_{total@100}$ is the combined quartile value at the 100% confidence level $Max_{total}$ is the combined quartile value at the desired confidence level $Max_{total@100}$ is the combined quartile value at the 100% confidence level.

Example Workload Analysis

The combined workload of 5 exemplary systems will now be estimated using the principles described above. Workload data in the form of normalized % CPU utilization for a period of 1 hour in 5 minute samples is shown below in Table 5.

TABLE 5

Sample Time-series % CPU Utilization Data

| Timestamp | System 1 | System 2 | System 3 | System 4 | System 5 | Total |
|---|---|---|---|---|---|---|
| 00:00 | 10 | 11 | 2 | 3 | 4 | 30 |
| 00:05 | 20 | 20 | 4 | 3 | 3 | 50 |
| 00:10 | 5 | 23 | 5 | 5 | 15 | 53 |
| 00:15 | 0 | 1 | 0 | 7 | 23 | 31 |
| 00:20 | 40 | 5 | 9 | 0 | 2 | 56 |
| 00:25 | 21 | 60 | 2 | 23 | 3 | 109 |
| 00:30 | 22 | 40 | 21 | 12 | 43 | 138 |
| 00:35 | 35 | 20 | 5 | 2 | 3 | 65 |
| 00:40 | 89 | 14 | 6 | 4 | 30 | 143 |
| 00:45 | 79 | 23 | 8 | 4 | 2 | 116 |

TABLE 5-continued

Sample Time-series % CPU Utilization Data

| Timestamp | System 1 | System 2 | System 3 | System 4 | System 5 | Total |
|---|---|---|---|---|---|---|
| 00:50 | 30 | 1 | 9 | 3 | 1 | 44 |
| 00:55 | 2 | 2 | 2 | 1 | 11 | 18 |

The time series data may then be summarized as quartiles and averages for each system as shown in Table 6 below.

TABLE 6

Quartile-based statistics

| Statistic | System 1 | System 2 | System 3 | System 4 | System 5 | Total |
|---|---|---|---|---|---|---|
| Average | 29.4 | 18.3 | 6.1 | 5.6 | 11.7 | 71.1 |
| Minimum | 0 | 1 | 0 | 0 | 1 | 2 |
| $1^{st}$ Quartile | 8.75 | 4.25 | 2 | 2.75 | 2.75 | 20.5 |
| Median | 21.5 | 17 | 5 | 3.5 | 3.5 | 50.5 |
| $3^{rd}$ Quartile | 36.25 | 23 | 8.25 | 5.5 | 17 | 90 |
| Maximum | 89 | 60 | 21 | 23 | 43 | 236 |
| Samples | 12 | 12 | 12 | 12 | 12 | 60 |

As noted earlier, the likelihood of a system being at its maximum value is 12.5% Similarly, the likelihood of the minimum value would also be 12.5%. Applying the binomial distribution function defined above, with these likelihoods, we can estimate the probabilities of the number of systems being at the same quartile at the same time. For example, assuming a total of 5 systems, the following Table 7 lists the probabilities for the number of systems being at their respective maximum values at the same time.

TABLE 7

Probability of Number of System at Maximum

| Number of systems at maximum value | Probability |
|---|---|
| 0 | 51.3% |
| 1 | 36.6% |
| 2 | 10.5% |
| 3 | 1.4% |
| 4 | 0.11% |
| 5 | 0.003% |

Thus, there is a 51.3% chance of 0 systems being at their maximum hourly value at the same time sample. Similarly, there is 0.003% chance of all 5 systems being at their hourly maximum at the same time sample.

The cumulative probabilities that consider the chances that at least a specific number of systems are at their respective maximum values at the same time are shown below in Table 8.

TABLE 8

Cumulative Probabilities for Maximum

| Number of systems at maximum value | Probability |
|---|---|
| 0 | 51.3% |
| 1 or less | 87.9% |
| 2 or less | 98.4% |
| 3 or less | 99.9% |
| 4 or less | 99.997% |
| 5 or less | 100% |

Since systems have the same likelihood of being at its minimum value (12.5%), the same probabilities listed above would apply to the minimum scenario.

Given a confidence interval, the likely number of systems that will be in contention can be determined. To determine the number of systems in contention for a given confidence interval, the entry that is just less than or equal to the specified probability can be selected. In addition, the number of systems in contention should always be at least 1.

The following Table 9 lists the number of systems in contention for a set of confidence intervals.

TABLE 9

Number of Systems in Contention for Specific Confidence Intervals

| Confidence Interval | # of Systems at Maximum |
|---|---|
| 100% | 5 |
| 99.999% | 4 |
| 99.9 | 3 |
| 99 | 2 |
| 75 | 1 |
| 50 | 1 |
| 0 | 1 |

Given the number of systems in contention, the combined workloads can be computed, using the formulae described previously, as shown below in Table 10.

TABLE 10

Combined Workloads

| Confidence Interval | Combined Minimum | Combined $1^{st}$ Quartile | Combined Median | Combined $3^{rd}$ Quartile | Combined Maximum |
|---|---|---|---|---|---|
| 100 | 3 | 21 | 51 | 90 | 236 |
| 99.999 | 13 | 28 | 53 | 86 | 207 |
| 99.9 | 23 | 35 | 55 | 82 | 180 |
| 99 | 33 | 42 | 58 | 79 | 155 |
| 75 | 43 | 50 | 61 | 76 | 131 |
| 50 | 43 | 50 | 61 | 76 | 131 |
| 0 | 43 | 50 | 61 | 76 | 131 |

In general, as the confidence interval is reduced, the predicted values approach the combined mean value of 71%. For instance, the combined maximum at 100% confidence level is 236% but is reduced to 155% at a 99% confidence level. Conversely, the combined minimum is 3% at the 100% confidence level and increases to 33% at the 99% confidence level.

These estimates of the combined workload values can then be used to determine whether a set of source systems can be consolidated onto a target system. In general, employing higher confidence levels results in higher combined workload estimates, resulting in lower and more conservative server consolidation ratios. Conversely, employing lower confidence limits results in lower combined workload estimates, resulting in higher server consolidation ratios but potentially increased risks.

Although the invention has been described with reference to certain specific embodiments, various modifications thereof will be apparent to those skilled in the art without departing from the spirit and scope of the invention as outlined in the claims appended hereto.

The invention claimed is:

1. A method for estimating combined system workloads, said method comprising:

obtaining a set of quantile-based workload data pertaining to a plurality of systems;
normalizing said quantile-based workload data to generate normalized workload data that compensates for relative measures between data pertaining to different ones of said plurality of systems;
determining a confidence level that has been specified to control a degree of conservatism in estimating combined system workloads for said plurality of systems, the specified confidence level being selectable from a plurality of confidence levels each indicative of a proportion of scenarios to be excluded from an analysis in order to vary the degree of conservatism;
using said specified confidence level to determine a degree of workload contention between said plurality of systems according to at least one probabilistic model;
using said degree of workload contention and said normalized workload data to combine workloads for said plurality of systems; and
storing a result indicative of one or more combined workloads according to the specified confidence level.

2. The method according to claim 1 further comprising obtaining a set of time series workload data and converting said time series workload data into said quantile-based workload data.

3. The method according to claim 2 wherein said time series data is collected from said plurality of systems using data collection inputs.

4. The method according to claim 2 wherein said quantile-based workload data is converted according to a specified quantile and a specified time interval.

5. The method according to claim 1 wherein said normalizing comprises reference to one or more benchmarks determined according to the nature of said plurality of systems.

6. The method according to claim 1 wherein said degree of workload contention is computed using a cumulative binomial distribution function.

7. The method according to claim 6 wherein said degree of workload contention is determined from a contention probability defined as follows:

$$F(m; n, p) = \sum_{k=0}^{m} \binom{n}{k} p^k (1-p)^{n-k}$$

where F is said contention probability, m is a number of systems in contention, n is the total number of said plurality of systems, p is the probability of a quantile value occurring for each system within a time window.

8. The method according to claim 1 wherein said combined workloads are estimated for the specified confidence level by blending a worst case value of systems in contention, an average of all other values of systems in contention, and an average of all values other than the worst case value and the average of all other values of systems in contention.

9. The method according to claim 8 wherein said blending is performed according to a ratio derived from a predicted contention level.

10. The method according to claim 9, wherein for a maximum workload scenario, said combined workload is computed as: $Max_{total} = Max_{max} + (m-1)*Max_{avg} + (n-m)*(Overall_{avg} - (m-1)*Max_{avg}/(n-1))$, where $Max_{max}$ is a largest of maximum values, $Max_{avg}$ is an average of maximum values of the other systems, $Overall_{avg}$ is an overall average of the other systems excluding the values associated with the system with the $Max_{max}$, n is a total number of systems being combined, and m is a likely number of systems in contention at the maximum value.

11. The method according to claim 9, wherein for a minimum workload scenario, said combined workload is computed as: $Min_{total} = Min_{max} + (m-1)*Min_{avg} + (n-m)*(Overall_{avg} - (m-1)*Min_{avg}/(n-1))$, where $Min_{max}$ is a largest of the minimum values, $Min_{avg}$ is an average of the minimum values of the other systems, $Overall_{avg}$ is an overall average of the other systems excluding the values associated with the system with the $Min_{max}$, n is a total number of system being combined, and m is a likely number of systems in contention at the minimum value.

12. The method according to claim 9, wherein for a quantile workload scenario, said combined workload is computed as: $Q_{total} = (Q_{total@100} - Min_{total@100})*(Max_{total} - Min_{total})/(Max_{total@100} - Min_{total@100}) + Min_{total}$, where: $Q_{total}$ is a combined inner quantile value at the desired confidence level, $Q_{total@100}$ is a combined inner quantile value at a 100% confidence level. $Min_{total}$ is a combined quartile value at a desired confidence level, $Min_{total@100}$ is a combined quartile value at the 100% confidence level, $Max_{total}$ is a combined quartile value at the desired confidence level, and $Max_{total@100}$ is a combined quartile value at the 100% confidence level.

13. The method according to claim 1 wherein said quantile-based workload data is obtained from a database.

14. A non-transitory computer readable medium comprising computer executable instructions for:
obtaining a set of quantile-based workload data pertaining to a plurality of systems;
normalizing said quantile-based workload data to generate normalized workload data that compensates for relative measures between data pertaining to different ones of said plurality of systems;
determining a confidence level that has been specified to control a degree of conservatism in estimating combined system workloads for said plurality of systems, the specified confidence level being selectable from a plurality of confidence levels each indicative of a proportion of scenarios to be excluded from an analysis in order to vary the degree of conservatism;
using said specified confidence level to determine a degree of workload contention between said plurality of systems according to at least one probabilistic model;
using said degree of workload contention and said normalized workload data to combine workloads for said plurality of systems; and
storing a result indicative of one or more combined workloads according to the specified confidence level.

15. A system for estimating combined system workloads, said system comprising a database for storing workload data, a processor, and computer executable instructions for operating the processor to:
obtain a set of quantile-based workload data pertaining to a plurality of systems;
normalize said quantile-based workload data to generate normalized workload data that compensates for relative measures between data pertaining to different ones of said plurality of systems;
determine a confidence level that has been specified to control a degree of conservatism in estimating combined system workloads for said plurality of systems, the specified confidence level being selectable from a plurality of confidence levels each indicative of a proportion of scenarios to be excluded from an analysis in order to vary the degree of conservatism;

use said specified confidence level to determine a degree of workload contention between said plurality of systems according to at least one probabilistic model;

use said degree of workload contention and said normalized workload data to combine workloads for said plurality of systems; and store a result indicative of one or more combined workloads according to the specified confidence level.

16. The non-transitory computer readable medium according to claim 14, further comprising instructions for obtaining a set of time series workload data and converting said time series workload data into said quantile-based workload data.

17. The non-transitory computer readable medium according to claim 16 wherein said time series data is collected from said plurality of systems using data collection inputs.

18. The non-transitory computer readable medium according to claim 16 wherein said quantile-based workload data is converted according to a specified quantile and a specified time interval.

19. The non-transitory computer readable medium according to claim 14 wherein said normalizing comprises reference to one or more benchmarks determined according to the nature of said plurality of systems.

20. The non-transitory computer readable medium according to claim 14 wherein said degree of workload contention is computed using a cumulative binomial distribution function.

21. The non-transitory computer readable medium according to claim 20 wherein said degree of workload contention is determined from a contention probability defined as follows $$F(m; n, p) = \sum_{k=0}^{m} \binom{n}{k} p^k (1-p)^{n-k},$$

where F is said contention probability, m is a number of systems in contention, n is the total number of said plurality of systems, p is the probability of a quantile value occurring for each system within a time window.

22. The non-transitory computer readable medium according to claim 14 wherein said combined workloads are estimated for the specified confidence level by blending a worst case value of systems in contention, an average of all other values of systems in contention, and an average of all values other than the worst case value and the average of all other values of systems in contention.

23. The non-transitory computer readable medium according to claim 22 wherein said blending is performed according to a ratio derived from a predicted contention level.

24. The non-transitory computer readable medium according to claim 23, wherein for a maximum workload scenario, said combined workload is computed as: $Max_{total} = Max_{max} + (m-1)*Max_{avg} + (n-m)*(Overall_{avg} - (m-1)*Max_{avg}/(n-1))$, where $Max_{max}$ is a largest of maximum values, $Max_{avg}$ is an average of maximum values of the other systems, $Overall_{avg}$ is an overall average of the other systems excluding the values associated with the system with the $Max_{max}$, n is a total number of systems being combined, and m is a likely number of systems in contention at the maximum value.

25. The non-transitory computer readable medium according to claim 23, wherein for a minimum workload scenario, said combined workload is computed as: $Min_{total} = Min_{max} + (m-1)*Min_{avg} + (n-m)*(Overall_{avg} - (m-1)*Min_{avg}/(n-1))$, where $Min_{max}$ is a largest of the minimum values, $Min_{avg}$ is an average of the minimum values of the other systems, $Overall_{avg}$ is an overall average of the other systems excluding the values associated with the system with the $Min_{max}$, n is a total number of system being combined, and m is a likely number of systems in contention at the minimum value.

26. The non-transitory computer readable medium according to claim 23, wherein for a quantile workload scenario, said combined workload is computed as: $Q_{total} = (Q_{total@100} - Min_{total@100})*(Max_{total} - Min_{total})/(Max_{total@100} + Min_{total@100})$ $Min_{total}$, where: $Q_{total}$ is a combined inner quantile value at the desired confidence level, $Q_{total@100}$ is a combined inner quantile value at a 100% confidence level. $Min_{total}$ is a combined quartile value at a desired confidence level, $Min_{total@100}$ is a combined quartile value at the 100% confidence level, $Max_{total}$ is a combined quartile value at the desired confidence level, and $Max_{total@100}$ is a combined quartile value at the 100% confidence level.

27. The non-transitory computer readable medium according to claim 14 wherein said quantile-based workload data is obtained from a database.

* * * * *